US012614670B2

(12) United States Patent
Tsutsumi et al.

(10) Patent No.: US 12,614,670 B2
(45) Date of Patent: Apr. 28, 2026

(54) MULTILAYER CERAMIC CAPACITOR

(71) Applicant: Murata Manufacturing Co., Ltd., Nagaokakyo (JP)

(72) Inventors: Hironori Tsutsumi, Nagaokakyo (JP); Mitsuru Ikeda, Nagaokakyo (JP); Akihiro Yoshida, Nagaokakyo (JP); Takayuki Shimakawa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 149 days.

(21) Appl. No.: 18/746,113

(22) Filed: Jun. 18, 2024

(65) Prior Publication Data

US 2025/0014820 A1     Jan. 9, 2025

(30) Foreign Application Priority Data

Jul. 3, 2023     (JP) ................................. 2023-109257

(51) Int. Cl.
| | |
|---|---|
| *H01G 4/012* | (2006.01) |
| *H01G 4/008* | (2006.01) |
| *H01G 4/232* | (2006.01) |
| *H01G 4/30* | (2006.01) |

(52) U.S. Cl.
CPC ............. *H01G 4/012* (2013.01); *H01G 4/232* (2013.01); *H01G 4/30* (2013.01); *H01G 4/0085* (2013.01)

(58) Field of Classification Search
CPC .......... H01G 4/012; H01G 4/232; H01G 4/30; H01G 4/0085
See application file for complete search history.

(56) References Cited

U.S. PATENT DOCUMENTS

| | | | | |
|---|---|---|---|---|
| 2005/0264975 A1* | 12/2005 | Yamazaki | ................ | H01C 7/18 |
| | | | | 361/301.1 |
| 2006/0139848 A1 | 6/2006 | Kim et al. | | |
| 2012/0073129 A1* | 3/2012 | Abe | ......................... | H01G 4/30 |
| | | | | 29/825 |
| 2012/0075766 A1* | 3/2012 | Nishioka | ................ | H01G 4/005 |
| | | | | 361/301.4 |
| 2012/0307418 A1* | 12/2012 | Kim | ....................... | H01G 4/012 |
| | | | | 361/321.2 |

(Continued)

FOREIGN PATENT DOCUMENTS

JP          2006-179873 A       7/2006

*Primary Examiner* — Michael P McFadden
(74) *Attorney, Agent, or Firm* — Keating & Bennett, LLP

(57) ABSTRACT

A multilayer ceramic capacitor includes an element body portion including dielectric layers and internal electrode layers, and external electrodes. In a cross section of the element body portion extending through a central portion in a length direction, a deviation amount in a width direction between internal electrode layers adjacent to each other in a thickness direction is smaller than about 3 μm, each of the internal electrode layers includes an opposing portion opposed to the internal electrode layer, and a lead-out portion, a width of the opposing portion is greater than a width of the lead-out portion, a region of the element body portion where the lead-out portions overlap in the thickness direction includes a thick portion thicker than the central portion in the length direction, and end portions of the lead-out portions in the thickness direction deviate by about 3 μm or more in the width direction.

17 Claims, 12 Drawing Sheets

(56)　　　　　　　References Cited

U.S. PATENT DOCUMENTS

| | | | |
|---|---|---|---|
| 2015/0325371 A1* | 11/2015 | Hattori ..................... | H01G 4/30 |
| | | | 361/301.4 |
| 2016/0240317 A1* | 8/2016 | Ro ........................... | H01G 4/30 |
| 2017/0213647 A1* | 7/2017 | Ahn ........................ | H01G 4/012 |
| 2017/0345571 A1* | 11/2017 | Imaeda .................. | H01G 4/248 |
| 2019/0096584 A1* | 3/2019 | Hong ..................... | H01G 13/00 |
| 2022/0262567 A1* | 8/2022 | Lee ........................ | H01G 4/012 |

* cited by examiner

MULTILAYER CERAMIC CAPACITOR

CROSS REFERENCE TO RELATED APPLICATIONS

This nonprovisional application is based on Japanese Patent Application No. 2023-109257 filed on Jul. 3, 2023, with the Japan Patent Office, the entire contents of which are hereby incorporated by reference.

BACKGROUND OF THE INVENTION

1. Field of the Invention

The present disclosure relates to multilayer ceramic capacitors.

2. Description of the Related Art

As a conventional multilayer ceramic capacitor, Japanese Patent Laid-Open No. 2006-179873 discloses a configuration including a multilayer body in which a plurality of dielectric layers and a plurality of internal electrode layers are laminated, chip protection members provided on both side surfaces of the multilayer body, and a pair of external electrodes provided on both end surfaces of the multilayer body.

The internal electrode layer includes an opposing portion opposing the electrode layer adjacent to the opposing portion in a lamination direction and a lead-out portion led out from the opposing portion to the end surface of the multilayer body. The lead-out portion has a width that is narrower than a width of the opposing portion.

In the multilayer ceramic capacitor described in Japanese Patent Laid-Open No. 2006-179873, the multilayer body has a rectangular parallelepiped shape, and the principal surfaces of the multilayer body facing each other in the thickness direction are substantially flat. Therefore, when moisture enters the interface between the principal surfaces and an external electrode from a tip end side of the external electrode, the moisture is more likely to reach an internal electrode in a portion exposed on an end surface side. In such a case, there is a concern that the moisture resistance reliability may be reduced due to the entry of moisture.

SUMMARY OF THE INVENTION

Example embodiments of the present invention provide multilayer ceramic capacitors each with improved moisture resistance reliability, each of the multilayer ceramic capacitors having a configuration in which a width of a lead-out portion of an internal electrode layer extending to an end surface of an element body portion is narrower than that of an opposing portion of the internal electrode layer.

A multilayer ceramic capacitor according to an example embodiment of the present invention includes an element body portion including a first principal surface and a second principal surface opposite to each other in a thickness direction, a first side surface and a second side surface opposite to each other in a width direction, and a first end surface and a second end surface opposite to each other in a length direction, and a plurality of dielectric layers and a plurality of internal electrode layers laminated in the thickness direction, and a pair of external electrodes provided respectively on the first end surface and the second end surface, and being electrically connected to the plurality of internal electrode layers. In a cross section of the element body portion extending through a central portion in the length direction and parallel or substantially parallel to the thickness direction and the width direction, a deviation amount in the width direction between internal electrode layers adjacent to each other in the thickness direction is less than about 3 μm. Each of the plurality of internal electrode layers includes an opposing portion opposed to an internal electrode layer adjacent thereof in the thickness direction, and a lead-out portion connected to the opposing portion and extending to the first end surface or the second end surface. A width of the opposing portion is greater than a width of the lead-out portion in the width direction.

A region of the element body portion at which the lead-out portions overlap in the thickness direction includes a thick portion which is thicker than the central portion of the element body portion in the length direction, and end portions in the width direction of the lead-out portions which are adjacent to each other in the thickness direction are deviated by about 3 μm or more in the width direction.

In a multilayer ceramic capacitor according to an example embodiment of the present invention, Si or Mg may be segregated in both of the end portions of the lead-out portion in the width direction.

In a multilayer ceramic capacitor according to an example embodiment of the present invention, Si may be segregated on a principal surface of the lead-out portion on one side in the thickness direction.

In a multilayer ceramic capacitor according to an example embodiment of the present invention, Mg may be segregated on a principal surface of the lead-out portion on one side in the thickness direction.

In a multilayer ceramic capacitor according to an example embodiment of the present invention, each of the plurality of internal electrode layers may include a non-connection end portion which is not connected to the external electrodes on a side opposite to a side on which the lead-out portion is located in the length direction. Si may be segregated in the non-connection end portion.

In a multilayer ceramic capacitor according to an example embodiment of the present invention, each of the plurality of internal electrode layers may include a non-connection end portion which is not connected to the external electrodes on a side opposite to a side on which the lead-out portion is located in the length direction. Mg may be segregated in the non-connection end portion.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
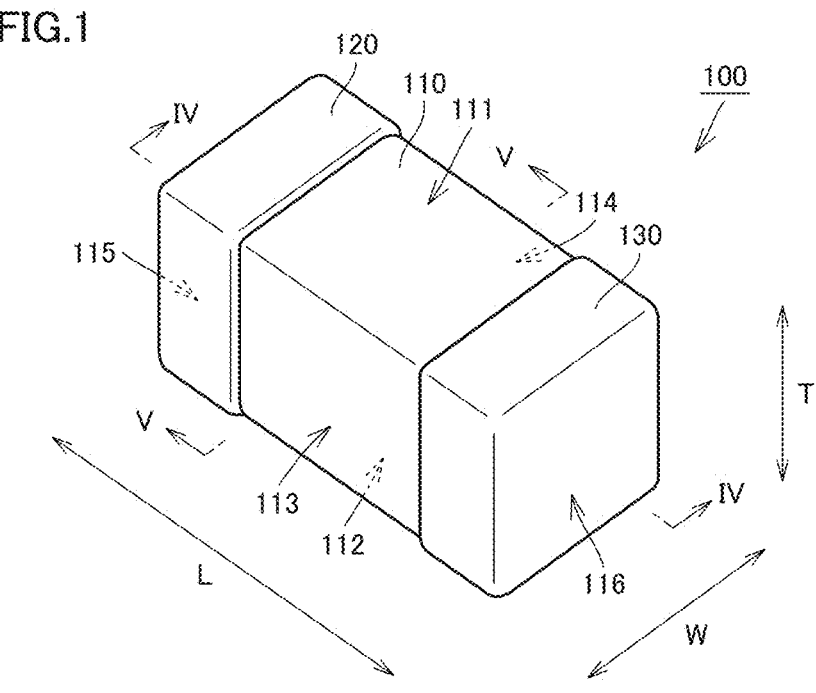
FIG. 1 is a perspective view schematically showing an appearance of a multilayer ceramic capacitor according to an example embodiment of the present invention.

Hereinafter, example embodiments of present the disclosure will be described in detail with reference to the drawings. In the example embodiments described below, the same or common portions are denoted by the same reference signs in the drawings, and description thereof will not be repeated. In the drawings, L, W, and T denote the length direction, width direction, and thickness direction of an element body portion to be described later, respectively.

Figure 2:
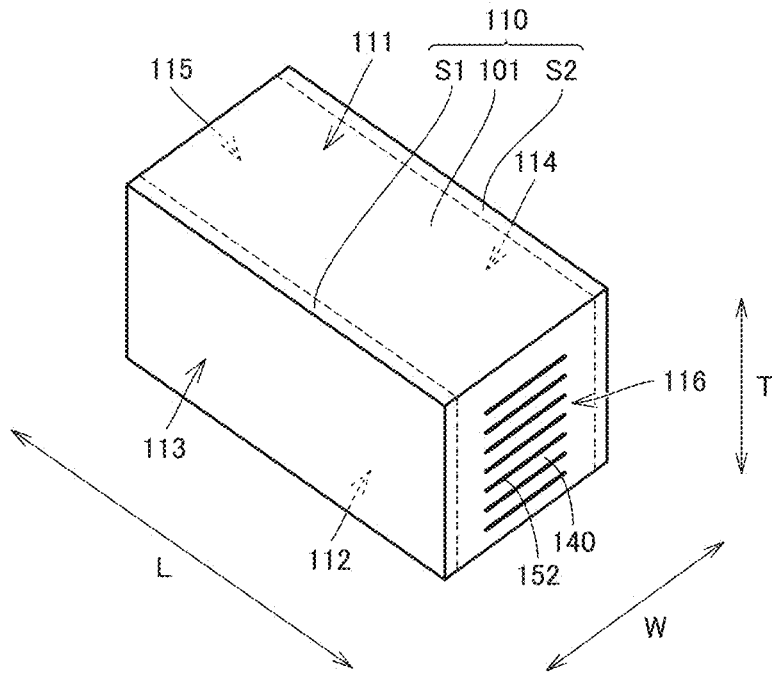
FIG. 2 is a perspective view schematically showing an element body portion of a multilayer ceramic capacitor according to an example embodiment of the present invention.
Figure 3:
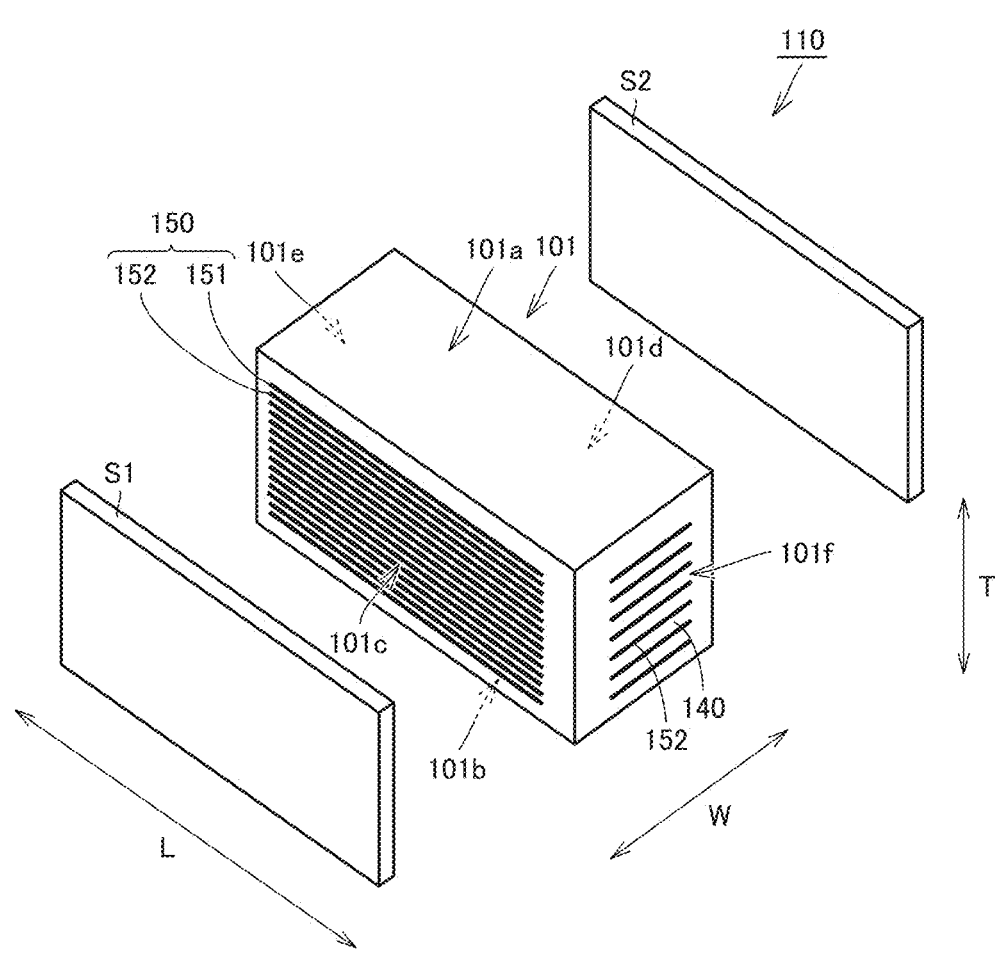
FIG. 3 is an exploded perspective view for schematically illustrating the configuration of the element body portion shown in FIG. 2.
Figures 4, 5:
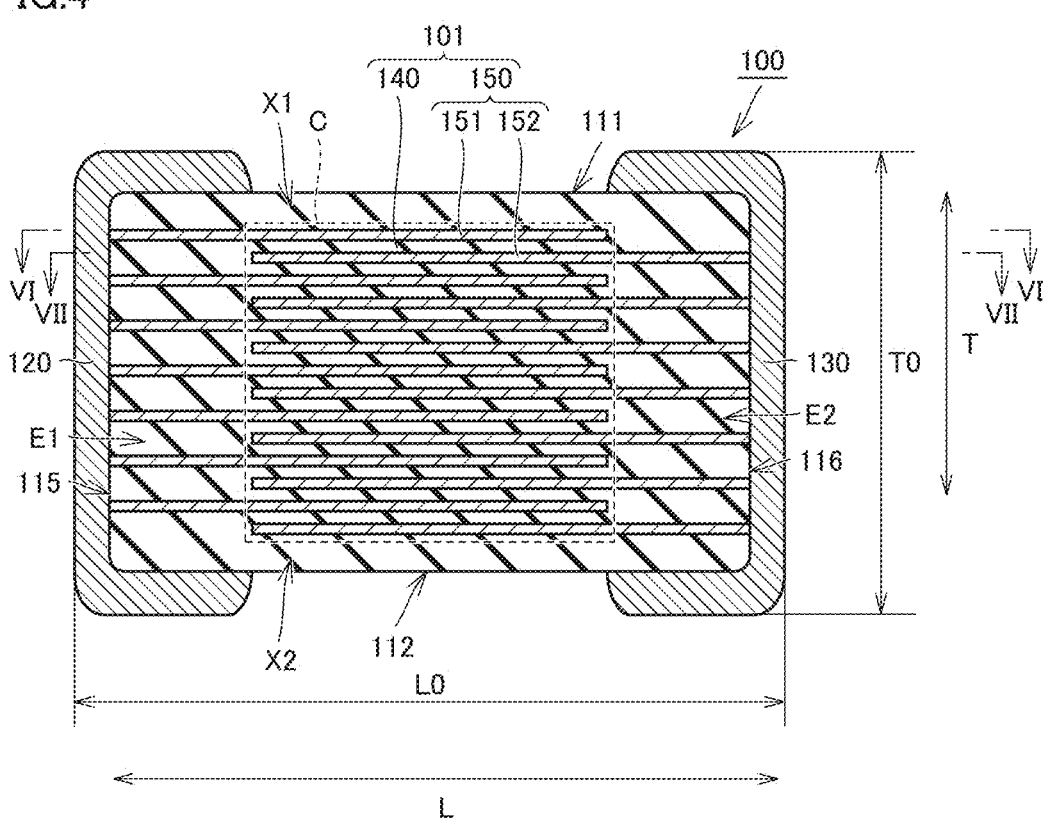
FIG. 4 is a schematic cross-sectional view taken along line IV-IV shown in FIG. 1.
FIG. 5 is a schematic cross-sectional view taken along line V-V shown in FIG. 1.

FIG. 1 is a perspective view schematically showing an appearance of a multilayer ceramic capacitor according to an example embodiment of the present invention. FIG. 2 is a perspective view schematically showing an element body portion of the multilayer ceramic capacitor according to the example embodiment. FIG. 3 is an exploded perspective view for schematically illustrating the configuration of the element body portion shown in FIG. 2. FIG. 4 is a schematic cross-sectional view taken along line IV-IV shown in FIG. 1. FIG. 5 is a schematic cross-sectional view taken along line V-V shown in FIG. 1. With reference to FIGS. 1 to 5, a multilayer ceramic capacitor 100 according to an example embodiment will be described.

As shown in FIGS. 1 to 5, multilayer ceramic capacitor 100 according to the present example embodiment includes an element body portion 110, a first external electrode 120, and a second external electrode 130.

Element body portion 110 has a rectangular or substantially rectangular parallelepiped shape. Element body portion 110 includes a first principal surface 111 and a second principal surface 112 opposed to each other in a thickness direction T, a first side surface 113 and a second side surface 114 opposed to each other in a width direction W intersecting thickness direction T, and a first end surface 115 and a second end surface 116 opposed to each other in a length direction L intersecting thickness direction T and width direction W.

It is preferable that element body portion 110 includes rounded corner portions and ridge portions. Here, each corner portion is a portion where three surfaces of element body portion 110 intersect, and each ridge portion is a portion where two surfaces of element body portion 110 intersect.

First external electrode 120 is provided on first end surface 115. Specifically, first external electrode 120 is provided on an entirety or substantially an entirety of first end surface 115, and extends from first end surface 115 to first principal surface 111, second principal surface 112, first side surface 113, and second side surface 114.

Second external electrode 130 is provided on second end surface 116. Specifically, second external electrode 130 is provided on an entirety or substantially an entirety of second end surface 116, and extends from second end surface 116 to first principal surface 111, second principal surface 112, first side surface 113, and second side surface 114.

The detailed configurations of first external electrode 120 and second external electrode 130 will be described later with reference to FIG. 16.

Element body portion 110 includes a multilayer body 101, a first side margin portion S1, and a second side margin portion S2.

Multilayer body 101 includes a pair of principal surfaces 101a and 101b opposed to each other in thickness direction T, a pair of side surfaces 101c and 101d opposed to each other in the width direction, and a pair of end surfaces 101e and 101f opposed to each other in the length direction. The pair of principal surfaces 101a and 101b define a portion of first principal surface 111 and second principal surface 112 of element body portion 110 described above. Side surface 101c is covered with first side margin portion S1, and side surface 101d is covered with second side margin portion S2. The pair of end surfaces 101e and 101f constitute a portion of first end surface 115 and second end surface 116 of element body portion 110 described above.

Multilayer body 101 includes a plurality of dielectric layers 140 and a plurality of internal electrode layers 150 alternately laminated in thickness direction T.

The plurality of internal electrode layers 150 include a plurality of first internal electrode layers 151 and a plurality of second internal electrode layers 152. The plurality of first internal electrode layers 151 and the plurality of second internal electrode layers 152 are alternately laminated in thickness direction T.

The plurality of first internal electrode layers 151 extend to first end surface 115. The plurality of first internal electrode layers 151 are connected to first external electrode 120. The plurality of second internal electrode layers 152 extend to second end surface 116. The plurality of second internal electrode layers 152 are connected to second external electrode 130. Both end portions of the plurality of first internal electrode layers 151 and the plurality of second internal electrode layers 152 in width direction W are exposed at side surfaces 101c and 101d.

Although FIGS. 3 to 5 show an example in which 7 first internal electrode layers 151 and 7 second internal electrode layers 152 are provided, the number of first internal electrode layers 151 or the number of second internal electrode layers 152 is not limited to 7.

Each of the plurality of dielectric layers 140 includes, for example, a dielectric ceramic material including, as a primary component, a perovskite compound including Ba and Ti. Dielectric layer 140 may include, for example, Si, Mg, Mn, V, Cr, and rare earth elements as additives.

Each of first internal electrode layer 151 and second internal electrode layer 152 includes Ni, for example. Each of first internal electrode layer 151 and second internal electrode layer 152 may further include, for example, dielectric particles of the same composition system as the ceramic included in dielectric layer 140. Each of first internal electrode layer 151 and second internal electrode layer 152 may include, for example, Sn at the interface with dielectric layer 140.

Multilayer body 101 is divided into an inner layer portion C, a first outer layer portion X1 and a second outer layer portion X2, and a first end margin portion E1 and a second end margin portion E2. Inner layer portion C has an electrostatic capacity due to a first opposing portion 151C, which will be described later, of first internal electrode layer 151 and a second opposing portion 152C, which will be described later, of second internal electrode layer 152 being laminated in thickness direction T.

First outer layer portion X1 and second outer layer portion X2 sandwich inner layer portion C in thickness direction T. First outer layer portion X1 is located outside inner layer portion C in thickness direction T and is located on first principal surface 111 side. Second outer layer portion X2 is located outside inner layer portion C in thickness direction T and is located on second principal surface 112 side.

First outer layer portion X1 and second outer layer portion X2 include, for example, a dielectric ceramic material including, as a primary component, a perovskite compound including Ba and Ti. First outer layer portion X1 and second outer layer portion X2 may include the same dielectric ceramic material as the plurality of dielectric layers 140, or may include a dielectric ceramic material different from the plurality of dielectric layers 140.

First end margin portion E1 and second end margin portion E2 sandwich inner layer portion C in length direction L. First end margin portion E1 is located outside inner layer portion C in length direction L and is located on first end surface 115 side. Second end margin portion E2 is located outside inner layer portion C in length direction L and is located on second end surface 116 side.

First side margin portion S1 is provided on side surface 101c of the multilayer body. First side margin portion S1 covers an entirety or substantially and entirety of side surface 101c. In element body portion 110, first side margin portion S1 extends from one end of internal electrode layer 150 located on one side in width direction W to first side surface 113.

Second side margin portion S2 is provided on side surface 101d of the multilayer body. Second side margin portion S2 covers an entirety or substantially an entirety of side surface 101d. In element body portion 110, second side margin portion S2 extends from the other end of internal electrode layer 150 located on the other side in width direction W to second side surface 114.

First side margin portion S1 and second side margin portion S2 each include, for example, a dielectric ceramic material including, as a primary component, a perovskite compound including Ba and Ti. First side margin portion S1 and second side margin portion S2 may include the same dielectric ceramic material as the plurality of dielectric layers 140, or may include a dielectric ceramic material different from the plurality of dielectric layers 140.

First side margin portion S1 and second side margin portion S2 may be, for example, a dielectric manufactured by a solid-phase method. In this case, no pores are present in the grains (granular materials) included in first side margin portion S1 and second side margin portion S2.

First side margin portion S1 and second side margin portion S2 may include, for example, Si and/or Mg. First side margin portion S1 and second side margin portion S2 may include, for example, Mn.

Si is segregated in first side margin portion S1 and second side margin portion S2. The segregation of Si can be confirmed by, for example, observing a cross section by SEM/EDX. Mn can be confirmed by observing Ti, Ba, or the like, which is the primary component, with an EPMA or the like.

First side margin portion S1 and second side margin portion S2 may include a plurality of layers. The plurality of layers does not particularly require the interfaces among the layers to be observed. For example, the grain size of the grains may be different on the side surface side and internal electrode layer 150 side, that is, the plurality of layers may include grains having different grain sizes in the width direction. The grain size of the grains can be measured using an electron microscope such as a TEM. For example, the area of each grain in the visual field is measured in a range of about 10 μm×about 10 μm, respectively. A circle equivalent diameter of each grain is calculated by area conversion, and an average value of circle equivalent diameter is defined as the grain size.

As described above, the size of multilayer ceramic capacitor 100 including element body portion 110, first external electrode 120, and second external electrode 130 is not particularly limited, for example, the following range can be adopted.

Multilayer ceramic capacitor 100 has a dimension (length dimension L0) which is greater than or equal to about 0.2 mm and less than or equal to about 4.5 mm in length direction L, for example. Multilayer ceramic capacitor 100 has a dimension (width dimension W0) which is greater than or equal to about 0.125 mm and less than or equal to about 3.2 mm in width direction W, for example. Multilayer ceramic capacitor 100 has a dimension (thickness dimension TO) which is greater than or equal to about 0.125 mm and less than or equal to about 2.5 mm in thickness direction T.

Multilayer ceramic capacitor 100 has, for example, a size with length dimension L0 of about 0.2 mm, width dimension W0 of about 0.125 mm, and thickness dimension TO of about 0.125 mm, a size with length dimension L0 of about 0.4 mm, width dimension W0 of about 0.2 mm, and thickness dimension TO of about 0.2 mm, a size with length dimension L0 of about 0.6 mm, width dimension W0 of about 0.3 mm, and thickness dimension TO of about 0.3 mm, a size with length dimension L0 of about 1.0 mm, width dimension W0 of about 0.5 mm, and thickness dimension TO of about 0.5 mm, a size with length dimension L0 of about 3.2 mm, width dimension W0 of about 1.6 mm, and thickness dimension TO of about 1.6 mm, or a size with length dimension L0 of about 4.5 mm, width dimension W0 of about 3.2 mm, and thickness dimension TO of about 2.5 mm. A tolerance is added to each of the sizes described above.

Figure 6:
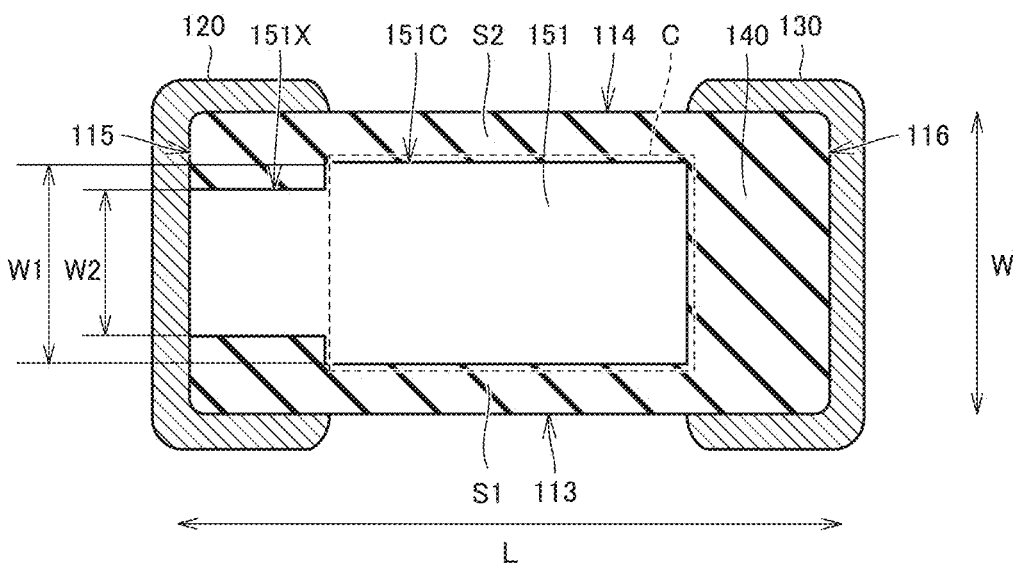
FIG. 6 is a schematic cross-sectional view taken along line VI-VI shown in FIG. 4.

FIG. 6 is a schematic cross-sectional view taken along line VI-VI shown in FIG. 4. With reference to FIG. 6, the shape of first internal electrode layer 151 will be described.

As shown in FIG. 6, first internal electrode layer 151 includes first opposing portion 151C and a first lead-out portion 151X. First opposing portion 151C opposes second internal electrode layer 152 which is adjacent in thickness direction T. First lead-out portion 151X connects first opposing portion 151C and first external electrode 120. First lead-out portion 151X is led out to first end surface 115. A width W1 of first opposing portion 151C in width direction W is larger than a width W2 of first lead-out portion 151X in the width direction. First opposing portion 151C and first lead-out portion 151X are integrally provided.

Figure 7:
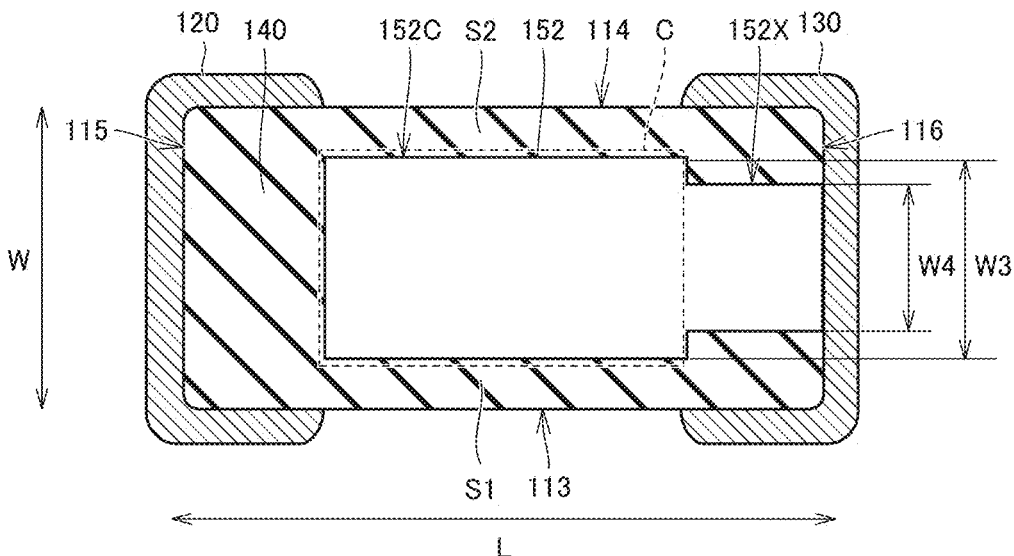
FIG. 7 is a schematic cross-sectional view taken along line VII-VII shown in FIG. 4.

FIG. 7 is a schematic cross-sectional view taken along line VII-VII shown in FIG. 4. With reference to FIG. 7, the shape of second internal electrode layer 152 will be described.

As shown in FIG. 7, second internal electrode layer 152 includes second opposing portion 152C and a second lead-out portion 152X. Second opposing portion 152C opposes first internal electrode layer 151 which is adjacent in thickness direction T. Second lead-out portion 152X connects second opposing portion 152C and second external electrode 130. Second lead-out portion 152X extends to second end surface 116. A width W3 of second opposing portion 152C in width direction W is larger than a width W4 of second lead-out portion 152X in the width direction. Second opposing portion 152C and second lead-out portion 152X are integrally provided.

First lead-out portion 151X and second lead-out portion 152X may be simply referred to as lead-out portions when they are not particularly distinguished from each other, and first opposing portion 151C and second opposing portion 152C may be simply referred to as opposing portions when they are not particularly distinguished from each other. Similarly, when first internal electrode layer 151 and second internal electrode layer 152 are not particularly distinguished from each other, they may be simply referred to as internal electrode layers. When first external electrode 120 and second external electrode 130 are not particularly distinguished from each other, they may be simply referred to as external electrodes.

Figure 8:
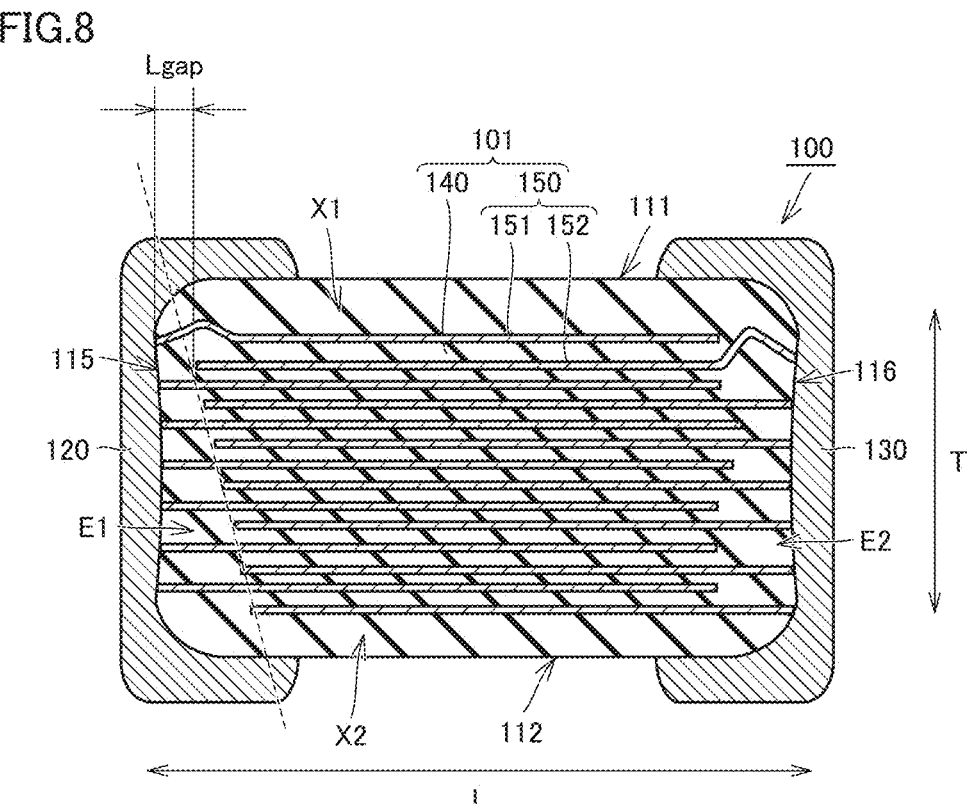
FIG. 8 is a schematic cross-sectional view for illustrating details of a multilayer ceramic capacitor according to an example embodiment of the present invention.

FIG. 8 is a schematic cross-sectional view for illustrating details of an internal electrode layer of the multilayer ceramic capacitor according to the present example embodiment. With reference to FIG. 8, multilayer ceramic capacitor 100 will be described in detail.

In element body portion 110, both within the portion sandwiched in thickness direction T by first external electrode 120 provided on first principal surface 111 and second principal surface 112, and within the portion sandwiched in thickness direction T by second external electrode 130 provided on first principal surface 111 and second principal surface 112, a portion of the plurality of internal electrode layers 150 has a shape bulging toward one of the principal surfaces, either first principal surface 111 or second principal surface 112.

Specifically, for example, on first end surface 115 side, the lead-out portion side of internal electrode layer 150 arranged closest to first principal surface 111 bulges toward first principal surface 111.

On second end surface 116 side, the lead-out portion side of internal electrode layer 150, which is arranged on second principal surface 112 side by one layer from internal electrode layer 150 arranged closest to first principal surface 111, bulges toward first principal surface 111. On the other hand, internal electrode layer 150 located closest to second principal surface 112 has a flat shape.

Internal electrode layers 150 that bulge toward first principal surface 111 are not limited to internal electrode layer 150 arranged closest to first principal surface 111 and internal electrode layer 150 adjacent thereto. For example, internal electrode layers 150 from internal electrode layer 150 located closest to first principal surface 111 to the third internal electrode layer on second principal surface 112 side may be curved. 20% or less of internal electrode layers 150 from internal electrode layer 150 arranged closest to first principal surface 111 among all the plurality of internal electrode layers 150 may bulge toward first principal surface 111.

In element body portion 110 within the portion sandwiched in thickness direction T by first external electrode 120 provided on first principal surface 111 and second principal surface 112, the portion of internal electrode layer 150 bulging toward first principal surface 111 is not limited to the lead-out portion, and may include the opposing portion of the portion located on the lead-out portion side.

Further, a portion of internal electrode layer 150 where the lead-out portion is not provided on first end surface 115 side may bulge toward first principal surface 111. In this case, the end portion side of internal electrode layer 150, which is located on the side opposite to the side where the lead-out portion is located, bulges.

The same applies to the portion of element body portion 110 sandwiched in thickness direction T by second external electrode 130 provided on first principal surface 111 and second principal surface 112.

A portion of the plurality of internal electrode layers 150 is curved toward first principal surface 111, and thus the contact area between inner layer portion C and first outer layer portion X1 can be increased. This can reduce or prevent delamination between the inner layer portion C and the first outer layer portion X1.

First end surface 115 and second end surface 116 each have a shape that is recessed inward in length direction L toward the central portion in thickness direction T. This can increase the contact area between first end surface 115 and first external electrode 120, as well as the contact area between second end surface 116 and second external electrode 130. As a result, the connection efficiency between internal electrode layer 150 and first external electrode 120 or second external electrode 130 can be increased.

When Lgap denotes the region to first end surface 115 of element body portion 110 in which internal electrode layers 150 adjacent to each other do not overlap in thickness direction T on first end surface 115 side (region outside the region where internal electrode layers 150 adjacent to each other overlap in thickness direction T), the length of Lgap in length direction L increases from first principal surface 111 toward second principal surface 112.

Specifically, for example, the length of Lgap from internal electrode layer 150, which is located in the fourth layer from first principal surface 111 side, to first end surface 115 is longer than the length of Lgap from internal electrode layer 150, which is located in the second layer from first principal surface 111 side, to first end surface 115. At least the Lgap from internal electrode layer 150 arranged closest to second principal surface 112 to first end surface 115 is longer than the Lgap from internal electrode layer 150 arranged closest to first principal surface 111 to first end surface 115.

By increasing the length of Lgap in this way, even if the Lgap of element body portion 110 is cracked, multilayer ceramic capacitor 100 can be prevented from being short circuited.

The relationship between the shape and the length described with reference to FIG. 8 can be observed by exposing a cross section that passes through the central portion of element body portion 110 in the width direction and is parallel or substantially parallel to length direction L and thickness direction T by polishing or the like and observing the cross section with an optical microscope, an electron microscope, or the like. When observing with the optical microscope or the electron microscope, a bright field and a dark field are used as necessary.

Figure 9:
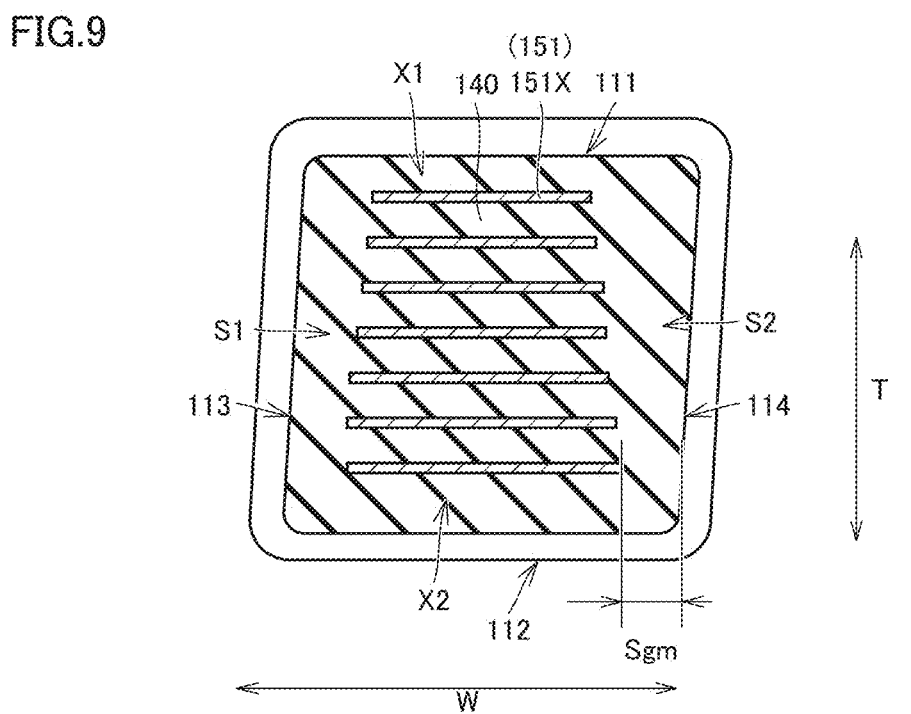
FIG. 9 is a schematic cross-sectional view for illustrating a shape of an element body portion on an end surface side and a state of a lead-out portion of an internal electrode layer in a multilayer ceramic capacitor according to an example embodiment of the present invention.

FIG. 9 is a schematic cross-sectional view for illustrating a shape of the element body portion on an end surface side and a state of a lead-out portion of the internal electrode layer in the multilayer ceramic capacitor according to the present example embodiment. FIG. 9 shows a cross section of element body portion 110 parallel to thickness direction T and width direction W on first end surface 115 side.

As shown in FIG. 9, the cross section of element body portion 110 parallel or substantially parallel to thickness direction T and width direction W has a parallelogram or substantially parallelogram shape. In the shape of the cross section, for example, the corners of the parallelogram are rounded. As described above, the cross section has a parallelogram or substantially parallelogram shape, and thus, it is possible to reduce the dimension in thickness direction T and to miniaturize multilayer ceramic capacitor 100.

The widths of the plurality of first lead-out portions 151X in width direction W may decrease toward one side in thickness direction T. Specifically, the widths of the plurality of first lead-out portions 151X may decrease from second principal surface 112 side toward first principal surface 111 side. The same applies to the plurality of second lead-out portions 152X.

When Sgm denotes the shortest distance from the end portions of the plurality of first lead-out portions 151X to first side surface 113 or second side surface 114 in the width direction, Sgm is, for example, greater than or equal to about 90 μm and less than or equal to about 110 μm. The numerical value of Sgm is not limited to the above.

The relationship between the shape and the length described with reference to FIG. 9 can be confirmed by, for example, polishing element body portion 110 from first external electrode 120 side to the extent that first end surface 115 is exposed, and observing a cross section of element body portion 110 parallel or substantially parallel to thickness direction T and width direction W with an optical microscope, an electron microscope, or the like. When observing with the optical microscope or the electron microscope, a bright field and a dark field are used as necessary.

Figures 10, 11:
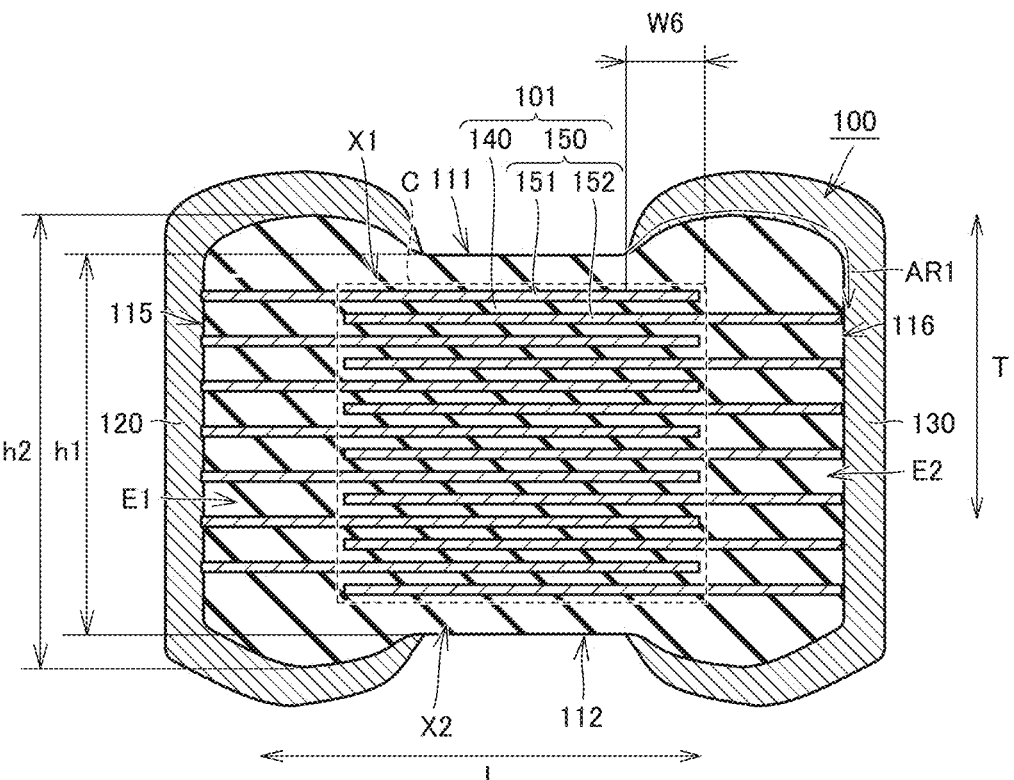
FIG. 10 is a schematic cross-sectional view for illustrating an outer shape of an element body portion on a central portion side in a length direction and a state of an opposing portion of an internal electrode layer in a multilayer ceramic capacitor according to an example embodiment of the present invention.
FIG. 11 is a schematic cross-sectional view for illustrating a detailed shape of an element body portion of a multilayer ceramic capacitor according to an example embodiment of the present invention.

FIG. 10 is a schematic cross-sectional view for illustrating an outer shape of the element body portion on a central portion side in a length direction and a state of an opposing portion of the internal electrode layer in the multilayer ceramic capacitor according to the present example embodiment. FIG. 10 shows a cross section of element body portion 110 parallel or substantially parallel to thickness direction T and width direction W at the central portion of element body portion 110 in length direction L.

As shown in FIG. 10, at least one of internal electrode layers 150, which are, for example, about 20% or less of the plurality of internal electrode layers 150 from a side closest to first principal surface 111 toward the central portion side in the thickness direction, protrudes outward in width direction W from internal electrode layer 150 located at the central portion in the thickness direction.

At least one of internal electrode layers 150, which is, for example, about 20% or less of the plurality of internal electrode layers 150 from a side closest to second principal surface 112 toward the central portion side in the thickness direction, protrudes outward in width direction W from internal electrode layer 150 located at the central portion in the thickness direction.

Thus, internal electrode layers 150 protruding in the width direction are provided on first principal surface 111 side and second principal surface 112 side, and thus, side surfaces 101c and 101d of multilayer body 101 each have an irregular shape. This can increase the contact area between side surface 101c and first side margin portion S1, and the contact area between side surface 101d and second side margin portion S2. This can reduce or prevent first side margin portion S1 and second side margin portion S2 from peeling off from multilayer body 101.

In a cross section of element body portion 110 parallel or substantially parallel to thickness direction T and width direction W at the central portion of element body portion 110 in length direction L, the deviation amount in width direction W between internal electrode layers 150 adjacent to each other in thickness direction T is, for example, smaller than about 3 μm.

When Sgc denotes the shortest distance from the end portions of the plurality of internal electrode layers 150 (more specifically, the opposing portion) to first side surface 113 or second side surface 114 in the width direction, Sgc is, for example, greater than or equal to about 10 μm and less than or equal to about 20 μm. The numerical value of Sgc is not limited to the above.

It is preferable that the Sgm is, for example, greater than or equal to about 5 times the Sgc. Thus, the moisture reliability of multilayer ceramic capacitor 100 can be improved.

In a cross section of element body portion 110 parallel or substantially parallel to thickness direction T and width direction W at the central portion of element body portion 110 in length direction L, each of first side surface 113 and second side surface 114 has a shape that is recessed inward in width direction W toward the central portion in thickness direction T.

The relationship between the shape and the length described with reference to FIG. 10 can be confirmed by, for example, polishing element body portion 110 from first external electrode 120 side to the central portion in length direction L, and observing a cross section of element body portion 110 parallel to thickness direction T and width direction W with an optical microscope, an electron microscope, or the like. When observing with the optical microscope or the electron microscope, a bright field and a dark field are used as necessary.

FIG. 11 is a schematic cross-sectional view for illustrating a detailed shape of the element body portion of the multilayer ceramic capacitor according to the present example embodiment. FIG. 11 shows a cross section of element body portion 110 which passes through the central portion in width direction W and is parallel or substantially parallel to thickness direction T and length direction L.

As shown in FIG. 11, first principal surface 111 and second principal surface 112 bulge outward in thickness direction T on both end portion sides in length direction L. Element body portion 110 includes thick portions which are thicker than the central portion in length direction L on both end portion sides in length direction L. More specifically, the region of element body portion 110 where the lead-out portions overlap in the thickness direction includes a thick portion which is thicker than the central portion of element body portion 110 in length direction L. The thick portion has a thickness h2 thicker than a thickness h1 of the central portion of element body portion 110 in length direction L.

As will be described later, the thick portion is provided in a region where a ceramic paste to eliminate bumps is arranged on a conductive paste to be internal electrode layer 150 in a manufacturing process.

Element body portion 110 is provided in a manner that the thickness gradually increases from a position about length W6 inward in length direction L from the end portion of inner layer portion C in length direction L and the thickness gradually decreases from a position where the thickness is the highest to the end surface. Length W6 is, for example, about 5 μm or less.

By providing the thick portion as described above, as indicated by an arrow AR1, the range covered by first external electrode 120 or second external electrode 130 from first principal surface 111 side to the end portion of the lead-out portion arranged at the position closest to first principal surface 111 is longer than in a configuration without the thick portion. This makes it difficult for moisture that enters from the tip end side of first external electrode 120 or second external electrode 130 located on first principal surface 111 to reach the end portion of the lead-out portion. As a result, the moisture resistance reliability of multilayer ceramic capacitor 100 can be improved.

Figure 12:
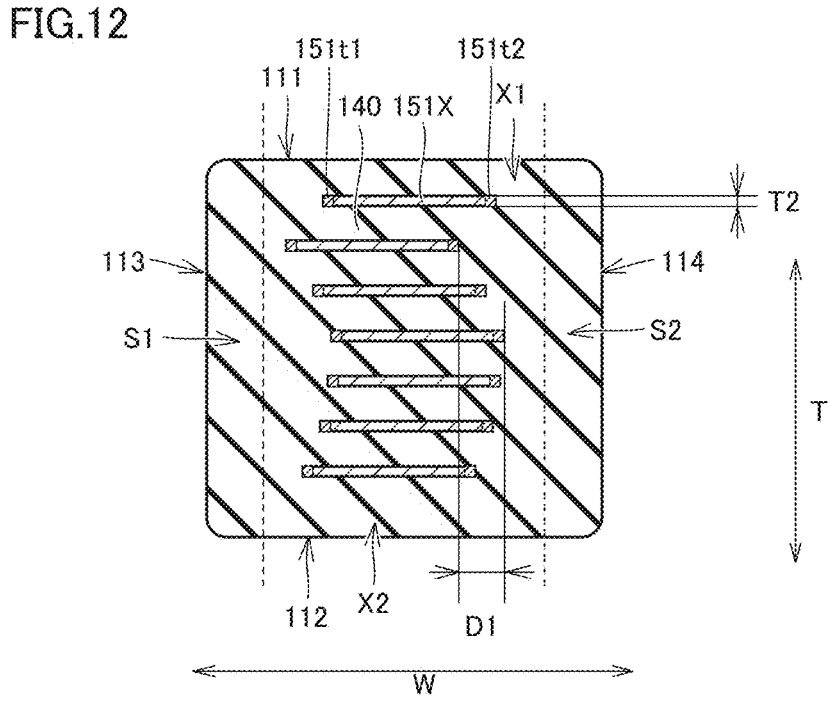
FIG. 12 is a schematic cross-sectional view for illustrating a deviation in a width direction of a lead-out portion of an internal electrode layer in a multilayer ceramic capacitor according to an example embodiment of the present invention.

FIG. 12 is a schematic cross-sectional view for illustrating a deviation in a width direction of the lead-out portion of the internal electrode layer in the multilayer ceramic capacitor according to the present example embodiment. FIG. 12 illustrates the shape of element body portion 110, the position of the lead-out portion, and the like for convenience to describe the deviation amount of the lead-out portion, and the shape of element body portion 110, the position of the lead-out portion, and the like are not limited to the aspect shown in FIG. 12.

As shown in FIG. 12, a deviation amount D1 in width direction W between first lead-out portion 151X located closest to first side surface 113 and first lead-out portion 151X located closest to second side surface 114 among the plurality of first lead-out portions 151X is, for example, greater than or equal to about 3 μm. Similarly, the deviation amount between first lead-out portions 151X adjacent to each other in the width direction is, for example, about 3 μm or more. The deviation amounts of the plurality of second lead-out portions 152X are the same or substantially the same as those of first lead-out portions 151X.

As described above, the deviation amount between the lead-out portions adjacent to each other in the thickness direction is, for example, about 3 μm or more, and thus, when moisture, which has entered the interface between first external electrode 120 or second external electrode 130 and first principal surface 111 from the tip end sides of first external electrode 120 and second external electrode 130, is about to reach a lead-out portion different from the lead-out portion located closest to the first principal surface, the path length from the tip end to the different lead-out portion is increased. This also makes it difficult for moisture to reach the lead-out portions, and thus, the moisture resistance reliability of multilayer ceramic capacitor 100 can be improved.

For example, Si or Mg is segregated in both end portions 151t1 and 151t2 of each of the plurality of first lead-out portions 151X in width direction W.

The end portions of the plurality of first lead-out portions 151X in the width direction are not aligned in thickness direction T, and are deviated in width direction W. In this case, a portion of internal electrode layers 150 adjacent to each other in the thickness direction may come close to one of both end portions 151t1 and 151t2 of the plurality of first lead-out portions 151X in the width direction. Si or Mg is segregated in both end portions 151t1 and 151t2, and thus, the insulation properties of both end portions 151t1 and 151t2 are improved, and short-circuiting between internal electrode layers 150 adjacent to each other in the thickness direction can be reduced or prevented. As a result, the reliability of multilayer ceramic capacitor 100 can be improved.

For example, Si or Mg is segregated also at the end portion in the width direction of each of the plurality of second lead-out portions 152X, and the same or substantially the same advantageous effects as described above is obtained.

In each of the plurality of first lead-out portions 151X and the plurality of second lead-out portions 152X, Si or Mg is segregated on the principal surface on one side in thickness direction. The principal surface on one side in the thickness direction is a principal surface on the side where the ceramic green sheet to eliminate bumps is arranged in the manufacturing process of multilayer ceramic capacitor 100 to be described later. Thus, for example, Si or Mg is segregated on the principal surface on the one side in the thickness direction of the lead-out portion, and thereby, insulation properties with respect to adjacent internal electrode layers 150 can be secured. Thus, the reliability of multilayer ceramic capacitor 100 can be improved.

A segregation amount of Si or Mg at an end portion of each of the plurality of lead-out portions in the width direction is larger than a segregation amount of Si or Mg on a principal surface on one side of the lead-out portion in the thickness direction. Thus, the reliability of multilayer ceramic capacitor 100 can be further improved.

Each of the plurality of internal electrode layers 150 includes a non-connection end portion (see FIG. 4) not connected to the external electrodes on the side opposite to the side where the lead-out portion is located in the length direction, and Si or Mg is segregated also in the non-connection end portion.

Figure 13:
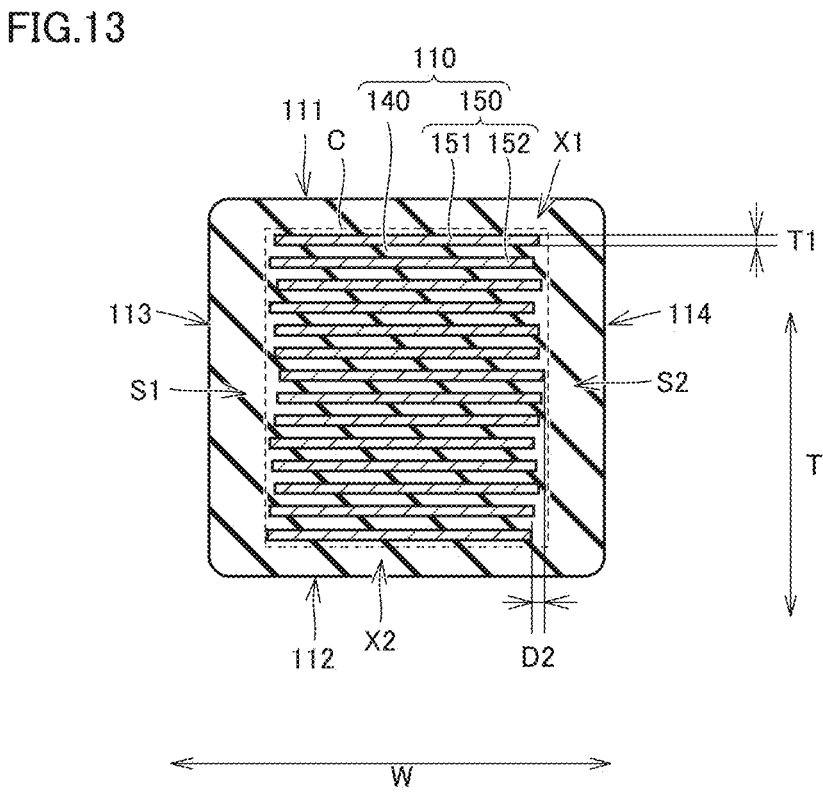
FIG. 13 is a schematic cross-sectional view for illustrating a deviation in a width direction of an opposing portion of an internal electrode layer in a multilayer ceramic capacitor according to an example embodiment of the present invention.

FIG. 13 is a schematic cross-sectional view for illustrating a deviation in a width direction of the opposing portion of the internal electrode layer in the multilayer ceramic capacitor according to the present example embodiment. FIG. 13 illustrates the shape of element body portion 110, the position of the opposing portion, and the like for convenience to describe the deviation amount of the opposing portion, and the shape of element body portion 110, the position of the opposing portion, and the like are not limited to the aspect shown in FIG. 13.

As shown in FIG. 13, a deviation amount D2 in width direction W between the opposing portion located closest to first side surface 113 and the opposing portion located closest to second side surface 114 among the plurality of opposing portions (more specifically, a plurality of first opposing portions 151C and a plurality of second opposing portions 152C) is, for example, smaller than about 3 μm. The deviation amount D2 is smaller than the deviation amount D1 described above, and satisfies the relationship of D1>D2. The deviation amount between the opposing portions adjacent to each other in the width direction is also, for example, smaller than about 3 μm.

When T1 denotes the thickness of the end portion of the opposing portion in width direction W and T2 denotes the thickness of the end portion of the lead-out portion in the width direction (see FIG. 12), the relation of T1>T2 may be satisfied.

Figure 14:
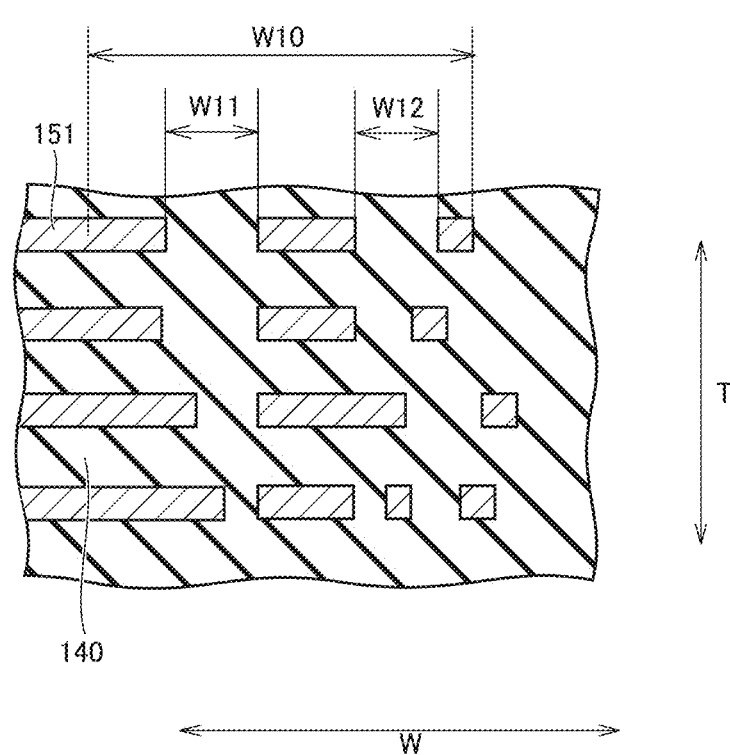
FIG. 14 is an enlarged schematic cross-sectional view showing an end portion in the width direction of a lead-out portion of a multilayer ceramic capacitor according to an example embodiment of the present invention.

FIG. 14 is an enlarged schematic cross-sectional view showing an end portion in the width direction of the lead-out portion of the multilayer ceramic capacitor according to the present example embodiment.

As shown in FIG. 14, when the end portions of first lead-out portions 151X in width direction W are enlarged, the end portions are scattered at intervals in the width direction and extend intermittently in the width direction. The end portions have gaps between adjacent portions at intervals in the width direction, with the gaps filled with dielectric layer 140. Here, when C1 denotes the continuity of the end portions of first lead-out portions 151X in width direction W and C2 denotes the continuity of the end portions of first opposing portions 151C in width direction W, the relation of C1>C2 is satisfied. Accordingly, on first opposing portion 151C side, the proportion of dielectric layers 140 entering the gaps at the end portions is increased, and dielectric layers 140 adjacent to each other are firmly fixed to each other in a manner of sandwiching internal electrode layers 150. As a result, delamination between internal electrode layers 150 and dielectric layers 140 can be reduced or prevented. The relationship of continuity is the same or substantially the same for second lead-out portions 152X and second opposing portions 152C.

The continuity of the end portions of first lead-out portions 151X and the continuity of the end portions of first opposing portions 151C can be measured as follows. First, first external electrode 120 is polished in a manner that first lead-out portions 151X are exposed in the cross section of multilayer ceramic capacitor 100 which is parallel or sub-stantially parallel to the width direction and the thickness direction. Some of first lead-out portions 151X located on the central portion side in thickness direction T are selected from the plurality of first lead-out portions 151X as first lead-out portions 151X to be measured.

At the end portion of selected first lead-out portion 151X, a range from the outermost position to a region inward by W10 in width direction W is confirmed by SEM/EDX, and widths W11 and W12 of a region where Ni is not detected are measured. For each of the selected plurality of first lead-out portions 151X, a value obtained by (W10−(W11+W12))/W10 (that is, a value obtained by subtracting the sum of the widths of the regions where Ni is not detected from the width of the measurement range and dividing the value after subtraction by the width of the measurement range) is calculated, and the average value of about 10 above values excluding abnormal values is used to indicate continuity.

W10 may be, for example, about 20 μm, and may be appropriately set in accordance with the size of multilayer ceramic capacitor 100.

The continuity of first opposing portions 151C, the continuity of second lead-out portions 152X, and the continuity of second opposing portions 152C can also be calculated in the same or substantially the same manner as described above.

Figure 15:
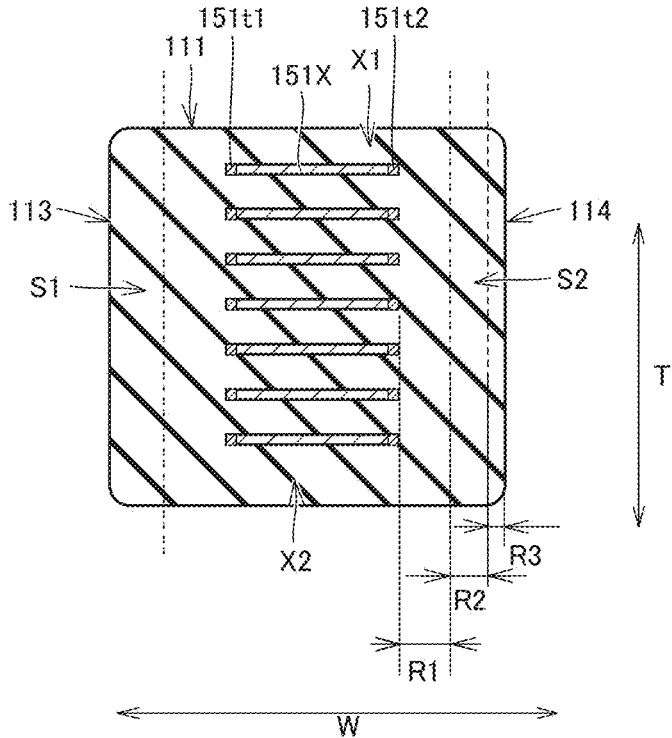
FIG. 15 is a schematic cross-sectional view for illustrating a grain size of a multilayer ceramic capacitor according to an example embodiment of the present invention.

FIG. 15 is a schematic cross-sectional view for illustrating a grain size of the multilayer ceramic capacitor according to the present example embodiment. FIG. 15 illustrates the shape of element body portion 110, the position of the lead-out portion, and the like for convenience to describe the region of element body portion 110 and the grain size of the region, and the shape of element body portion 110, the position of the lead-out portion, and the like are not limited to the aspect shown in FIG. 15. FIG. 15 shows a state of a plurality of dielectric layers 140, which are produced using the solid-phase method.

As shown in FIG. 15, the region of element body portion 110 from the end portion of the lead-out portion to the side surface close to the end portion in the width direction can be divided into a first region R1, a second region R2, and a third region R3 in order from the inside in the width direction toward the outside in the width direction.

Specifically, first region R1 is a portion from the end portion of first lead-out portion 151X in the width direction located on second side surface 114 side to second side margin portion S2. Second region R2 and third region R3 constitute second side margin portion S2.

A width of first region R1 in width direction W is larger than a width of second region R2 in width direction W. The width of second region R2 in width direction W is larger than a width of third region R3 in width direction W.

Specifically, for example, first region R1 has a width that is greater than or equal to about 50 μm. Second region R2 has a width that is less than or equal to about 10 μm. Third region R3 has a width that is less than or equal to about 3 μm. These widths are measured at the central portion in the thickness direction of the cross section of element body portion 110, which is parallel or substantially parallel to width direction W and thickness direction T, from which first lead-out portion 151X is exposed.

Here, the amount of Mn is larger in second side margin portion S2 than in dielectric layer 140 of multilayer body 101 (more specifically, dielectric layer 140 of inner layer portion C). Accordingly, the grain size of second side margin portion S2 is smaller than the grain size of dielectric layer 140.

Specifically, when gr1 denotes the grain size of first region R1, gr2 denotes the grain size of second region R2, and gr3 denotes the grain size of third region R3, a relationship of gr1>gr2>gr3 is satisfied. The grain size is the above-described circle equivalent diameter.

As described above, when dielectric layer 140 and the side margin portions are produced using the solid-phase method, no pores are present in the grains, and voids are formed between the grains. The holes formed in the grains are defined as pores, and the gaps formed between the grains are defined as voids. The voids between the grains refer to, for example, a state like a triple point.

The quantity of the voids included in second region R2 and third region R3 is smaller than the quantity of the voids included in first region R1.

On the other hand, when the plurality of dielectric layers 140 is produced using a hydro-thermal synthesis method, the grain size of dielectric layers 140 (more specifically, dielectric layers 140 of inner layer portion C) of multilayer body 101 is smaller than the grain size of second side margin portion S2. In this case, pores may be provided in the grains of dielectric layers 140.

In the above description, the pores or voids can be observed using an electron microscope such as, for example, SEM or TEM.

Figure 16:
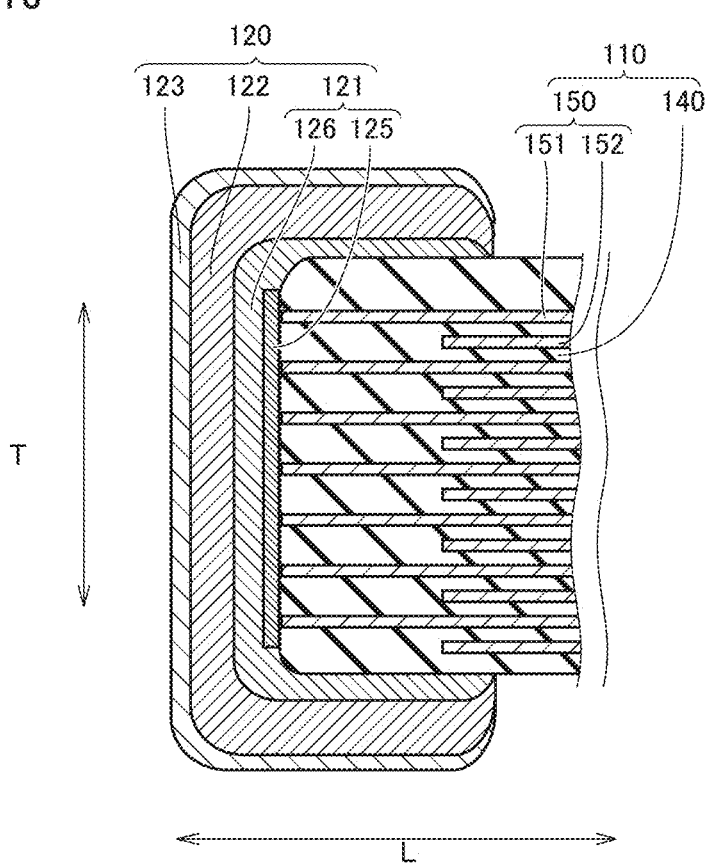
FIG. 16 is a schematic cross-sectional view showing a detailed configuration of an external electrode of a multilayer ceramic capacitor according to an example embodiment of the present invention.

FIG. 16 is a schematic cross-sectional view showing a detailed configuration of an external electrode of the multilayer ceramic capacitor according to the present example embodiment. With reference to FIG. 16, the detailed configuration of the external electrode is illustrated. First external electrode 120 and second external electrode 130 have the same or substantially the same configuration.

As shown in FIG. 16, for example, first external electrode 120 and second external electrode 130 include a Cu layer 121 provided on element body portion 110, a Ni plating layer 122 provided on Cu layer 121, and a Sn plating layer 123 provided on Ni plating layer 122.

Cu layer 121 includes a first layer portion 125 connected to the plurality of first lead-out portions 151X or the plurality of second lead-out portions 152X, and a second layer portion 126 covering first layer portion 125.

First layer portion 125 is a Cu-rich layer, and has a higher Cu content than second layer portion 126. First layer portion 125 extends in thickness direction T on first end surface 115 or second end surface 116. Second layer portion 126 is a glass-rich layer, and has a higher glass content than first layer portion 125.

First layer portion 125 has high continuity in thickness direction T. In a cross section of multilayer ceramic capacitor 100 that passes through the central portion in the width direction and is parallel or substantially parallel to the thickness direction and the length direction, first layer portion 125 extends in thickness direction T in a manner of bridging between the lead-out portions adjacent to each other in thickness direction T. In the above description, high continuity means a state in which Cu is in contact with the exposed portion of the end surface of the internal electrode layer and these are continuously connected in the thickness direction in a layer form. First layer portion 125 serves to ensure the connectivity with internal electrode layer 150. Cu contained in first layer portion 125 can be made continuous by making Cu powder in Cu paste used for the Cu layer minute and appropriately adjusting sintering conditions.

First layer portion 125 of first external electrode 120 is connected to the plurality of first lead-out portions 151X. First layer portion 125 of first external electrode 120 is a layer in which Cu is continuous so as to connect first lead-out portions 151X which are adjacent to each other.

In the cross section of multilayer ceramic capacitor 100 that passes through the central portion in the width direction and is parallel or substantially parallel to the thickness direction and the length direction, first layer portion 125 of first external electrode 120 extends in thickness direction T in a manner of connecting, for example, about 80% or more of the plurality of first lead-out portions 151X.

First layer portion 125 of second external electrode 130 is connected to the plurality of second lead-out portions 152X. First layer portion 125 of second external electrode 130 is a layer in which Cu is continuous so as to connect second lead-out portions 152X which are adjacent to each other.

In the cross section of multilayer ceramic capacitor 100 that passes through the central portion in the width direction and is parallel or substantially parallel to the thickness direction and the length direction, first layer portion 125 of second external electrode 130 extends in thickness direction T in a manner of connecting, for example, about 80% or more of the plurality of second lead-out portions 152X.

Ni is diffused in first layer portion 125. The plurality of internal electrode layers 150 include, for example, Ni as described above, and Ni is diffused from first lead-out portion 151X and second lead-out portion 152X into first layer portion 125. In first layer portion 125, the concentration of Ni increases toward element body portion 110. By diffusing Ni in this way, even when the widths of first lead-out portion 151X and second lead-out portion 152X are small, the connectivity between first lead-out portion 151X or second lead-out portion 152X and first layer portion 125 can be improved.

In the cross section of multilayer ceramic capacitor 100 that passes through the central portion in width direction W and is parallel or substantially parallel to thickness direction T and length direction L, the thickness of first layer portion 125 in length direction L at the central portion in thickness direction T is, for example, about 25% or less of the total thickness of Cu layer 121 in length direction L at the central portion in thickness direction T. It is preferable that the thickness of first layer portion 125 is, for example, about 5% or less of the total thickness of Cu layer 121.

First layer portion 125 can be observed using, for example, SEM/EDX. The degree of diffusion of Ni in first layer portion 125 can be detected by composition analysis such as WDX or EDX in the cross section.

Second layer portion 126 includes, for example, Cu and glass. For example, glass occupies about 10% or more of the cross-sectional area of second layer portion 126 in the cross section of multilayer ceramic capacitor 100 that passes through the central portion in the width direction and is parallel or substantially parallel to the thickness direction and the length direction. More specifically, in the cross section, for example, glass may occupy about 25% or more of the cross-sectional area of second layer portion 126. By including Cu in second layer portion 126, hydrogen is easily adsorbed, and reliability is improved.

In the cross section of multilayer ceramic capacitor 100 that passes through the central portion in width direction W and is parallel or substantially parallel to thickness direction T and length direction L, the thickness of second layer portion 126 in length direction L is, for example, about 75% or more of the thickness of Cu layer 121 in the length direction at a portion where the thickness of first external electrode 120 in length direction L is the greatest. Thus, hydrogen can be sufficiently adsorbed by second layer portion 126. The thickness and the like of second layer portion 126 can be measured using an SEM or the like.

Manufacturing Method

Figure 17:
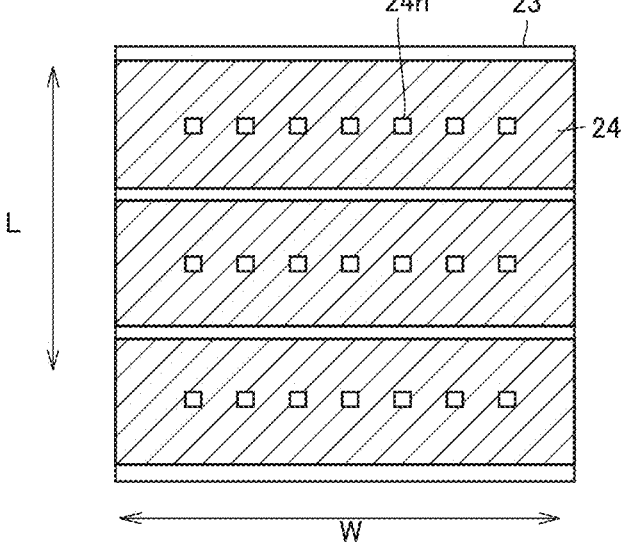
FIG. 17 is a diagram showing a step of providing a conductive pattern on an inner layer ceramic green sheet in a manufacturing process of a multilayer ceramic capacitor according to an example embodiment of the present invention.
Figure 18:
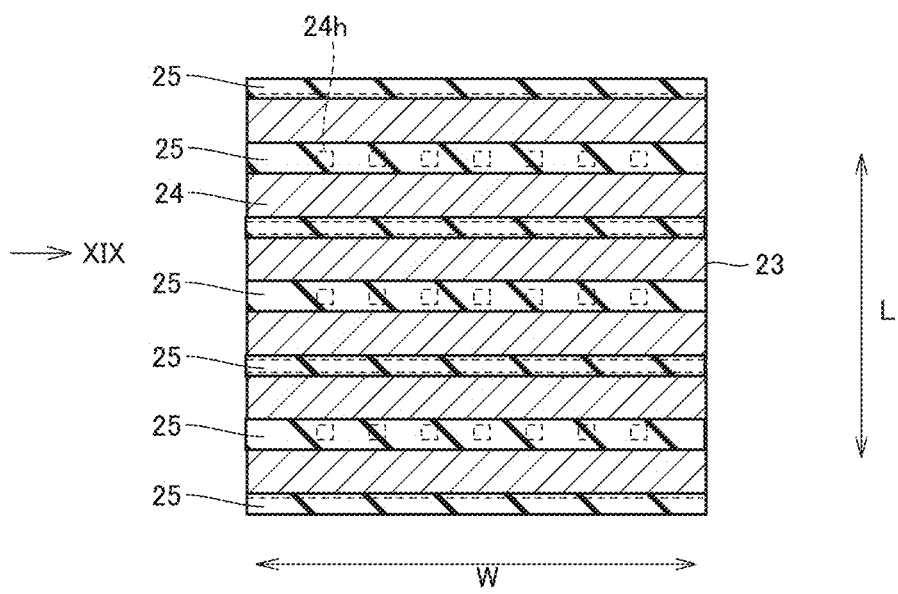
FIG. 18 is a diagram showing a step of arranging a ceramic paste for eliminating bumps in a manufacturing process of a multilayer ceramic capacitor according to an example embodiment of the present invention.
Figure 19:
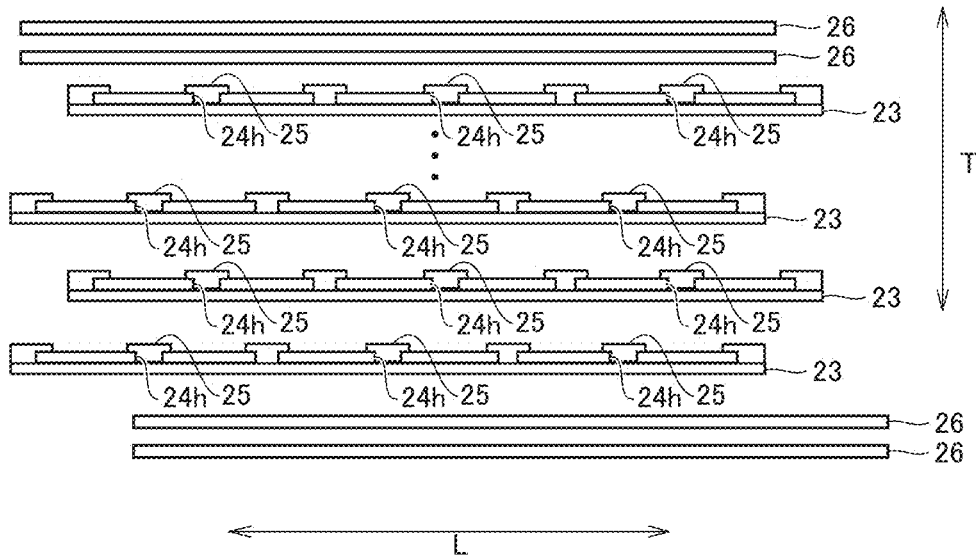
FIG. 19 is a diagram showing a step of laminating a plurality of inner layer ceramic green sheets and a plurality of outer layer ceramic green sheets in a manufacturing process of a multilayer ceramic capacitor according to an example embodiment of the present invention.

FIGS. 17 to 19 are diagrams showing an example of a manufacturing process of the multilayer ceramic capacitor according to the present example embodiment. An example of a method for manufacturing multilayer ceramic capacitor 100 will be described with reference to FIGS. 17 to 19.

In manufacturing multilayer ceramic capacitor 100, a ceramic slurry including a ceramic powder, a binder, and a solvent is first prepared. The ceramic powder can be synthesized by a known method such as, for example, solid-phase method or hydro-thermal synthesis method.

The ceramic slurry is formed into a sheet shape on a carrier film using, for example, a die coater, a gravure coater, a micro-gravure coater, or the like, and thus, an inner layer ceramic green sheet 23 and an outer layer ceramic green sheet 26, which will be described later, are produced.

FIG. 17 is a diagram showing a step of providing a conductive pattern on an inner layer ceramic green sheet in a manufacturing process of the multilayer ceramic capacitor according to the present example embodiment.

Next, as shown in FIG. 17, a plurality of strip-shaped conductive patterns 24 extending in a predetermined direction are formed on inner layer ceramic green sheet 23. The plurality of strip-shaped conductive patterns 24 are arranged at intervals in an arrangement direction orthogonal or substantially orthogonal to the extending direction of conductive patterns 24. Conductive patterns 24 are portions defining and functioning as internal electrode layers 150. Each strip-shaped conductive pattern 24 is provided with a plurality of openings 24h at intervals in the extending direction of conductive pattern 24. Conductive pattern 24 in a portion located between openings 24h adjacent to each other in the extending direction is a portion defining and functioning as a lead-out portion. The extending direction of conductive pattern 24 is parallel or substantially parallel to width direction W. The arrangement direction is parallel or substantially parallel to length direction L.

Conductive patterns 24 are printed on inner layer ceramic green sheet 23 by, for example, screen printing, ink jet printing, gravure printing, or the like.

FIG. 18 is a diagram showing a step of arranging a ceramic paste for eliminating bumps in the manufacturing process of the multilayer ceramic capacitor according to the present example embodiment.

Next, as shown in FIG. 18, a ceramic paste 25 for eliminating bumps is applied. Specifically, ceramic paste 25 is applied onto inner layer ceramic green sheet 23 in a region where conductive patterns 24 are not formed in the extending direction, and ceramic paste 25 is applied onto each conductive pattern 24 in a manner of filling the plurality of openings 24h arranged in the extending direction.

In order to facilitate the alignment, ceramic paste 25 is applied to partially overlap conductive patterns 24. It is preferable that in the arrangement direction in which the plurality of conductive patterns 24 is arranged, ceramic paste 25 applied to the outside of each conductive pattern 24 overlaps conductive patterns 24, for example, in a range within about 5 μm from the end portions of conductive patterns 24 in the arrangement direction.

Ceramic paste 25 is printed by, for example, screen printing, inkjet printing, gravure printing, or the like.

Ceramic paste 25 may be formed of the same material as the material of inner layer ceramic green sheet 23, or may include a different component. As described above, when Si or Mg is segregated on both end portions of the lead-out portion in the width direction and on the principal surface of the lead-out portion on one side in the thickness direction, Si and/or Mg is added to ceramic paste 25.

In the above description, the case where ceramic paste 25 is applied after conductive patterns 24 are applied is exemplified. However, conductive patterns 24 may be applied after ceramic paste 25 is applied.

FIG. 19 is a diagram showing a step of laminating a plurality of inner layer ceramic green sheets and a plurality of outer layer ceramic green sheets in the manufacturing process of the multilayer ceramic capacitor according to the present example embodiment. FIG. 19 shows a state in which a plurality of inner layer ceramic green sheets 23 and a plurality of outer layer ceramic green sheets 26 are laminated, as viewed from an arrow XIX direction shown in FIG. 18.

As shown in FIG. 19, the plurality of inner layer ceramic green sheets 23 and the plurality of outer layer ceramic green sheets 26, on which conductive patterns 24 and ceramic paste 25 are applied, are laminated.

The plurality of inner layer ceramic green sheets 23 are laminated such that strip-shaped conductive patterns 24 are deviated in the arrangement direction by half the printing pitch of conductive patterns 24 between adjacent inner layer ceramic green sheets 23. Specifically, the plurality of inner layer ceramic green sheets 23 are laminated such that openings 24h of conductive patterns 24 provided on inner layer ceramic green sheets 23 adjacent to each other in a lamination direction are alternately arranged in the arrangement direction when viewed in the lamination direction. The lamination direction is parallel or substantially parallel to thickness direction T, and the arrangement direction is parallel or substantially parallel to length direction L.

The plurality of outer layer ceramic green sheets 26 are laminated on both sides of the laminated plurality of inner layer ceramic green sheets 23 in the lamination direction.

Figure 20:
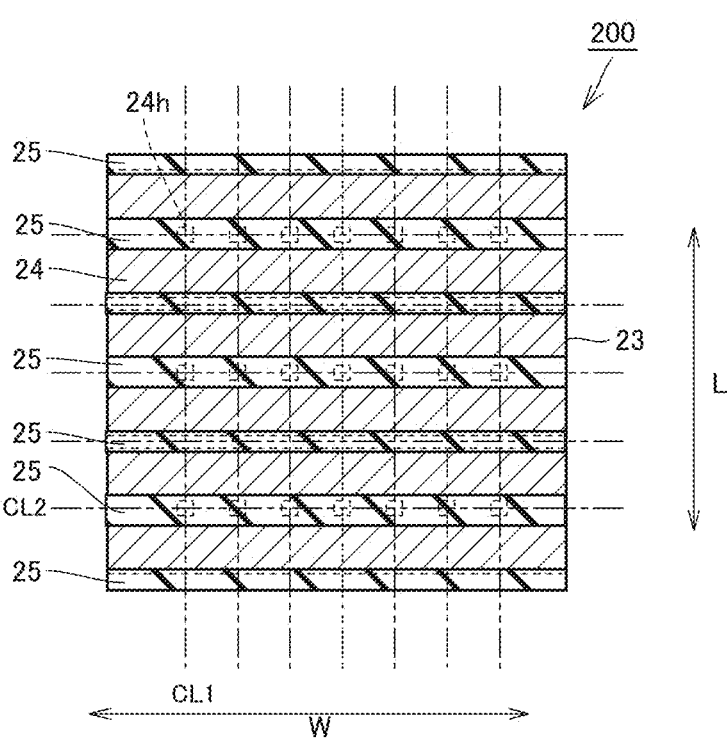
FIG. 20 is a diagram showing a step of cutting a structure in which a plurality of inner layer ceramic green sheets and a plurality of outer layer ceramic green sheets are thermo-compression bonded in a manufacturing process of a multilayer ceramic capacitor according to an example embodiment of the present invention.

Next, the laminated plurality of inner layer ceramic green sheets 23 and the laminated plurality of outer layer ceramic green sheets 26 are thermo-compression bonded to form a structure 200 (see FIG. 20).

FIG. 20 is a diagram showing a step of cutting a structure in which a plurality of inner layer ceramic green sheets and a plurality of outer layer ceramic green sheets are thermo-compression bonded in the manufacturing process of the multilayer ceramic capacitor according to the example embodiment. FIG. 20 shows a schematic plan view of the structure, but for convenience, outer layer ceramic green sheet 26 is omitted and inner layer ceramic green sheet 23, on which conductive pattern 24 is shown, is illustrated in the plan view.

Figure 21:
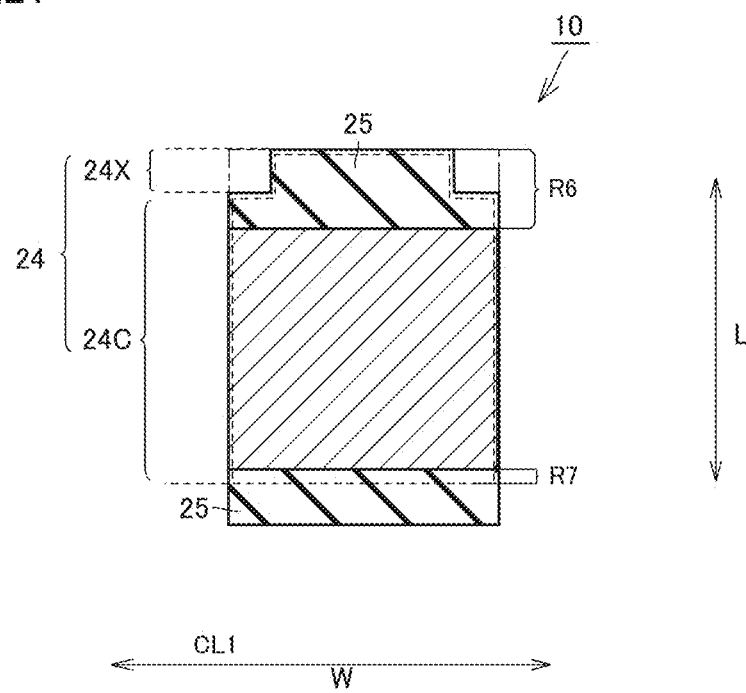
FIG. 21 is a diagram showing a region in which a ceramic paste for eliminating bumps is arranged in a multilayer chip which has been individualized.

Then, as shown in FIG. 20, structure 200 is cut along cut lines CL1 and CL2 to cut out a multilayer chip 10 (see FIG. 21). Cut line CL1 is parallel or substantially parallel to length direction L. Cut line CL2 is parallel to width direction W. Structure 200 is cut by press cutting using, for example, a press cutting blade, dicing using a cutting blade, laser cutting, or the like. The multilayer chip is a portion defining and functioning as multilayer body 101.

FIG. 21 is a diagram showing a region in which the ceramic paste for eliminating bumps is arranged in a multilayer chip which has been individualized.

FIG. 21 shows a cross section of multilayer chip 10 parallel or substantially parallel to length direction L and the width direction, and shows a range of conductive pattern 24 by broken lines. In multilayer chip 10, conductive pattern 24 includes a lead-out region 24X serving as the lead-out portion and an opposing region 24C serving as the opposing portion.

Ceramic paste 25 for eliminating bumps overlaps conductive pattern 24 in a region R6 and a region R7. Region R6 is a region where lead-out region 24X is formed and opposing region 24C of a portion located close to lead-out region 24X. Region R7 is a region on the end portion side of opposing region 24C, which is located on the side opposite to the side where lead-out region 24X is located.

Therefore, conductive pattern 24 defining and functioning as internal electrode layer 150 and ceramic paste 25, which defines a portion of dielectric layer 140, overlap in region R6 and region R7, and thus, a portion of multilayer body 101 bulges on both sides in length direction L as described above.

Furthermore, by adding Si and/or Mg to ceramic paste 25 for eliminating bumps, Si and/or Mg can be segregated in region R6 and region R7 of internal electrode layer 150.

Subsequently, a ceramic paste is applied to both end surfaces of multilayer chip 10 in the width direction. Specifically, the ceramic paste is filled in a plurality of recesses (grooves) provided on an application surface of a plate, and the end surface of multilayer chip 10 in the width direction is brought into contact with the application surface. Thus, the ceramic paste can be applied only to the end surface by capillary action. The applied ceramic paste is sintered to form first side margin portion S1 and second side margin portion S2.

The ceramic paste may be formed of the same material as the material of inner layer ceramic green sheet 23, or may include a different component. First side margin portion S1 and second side margin portion S2 can be densified by making the ceramic paste include more Mn than inner layer ceramic green sheet 23. The ceramic powder contained in the ceramic paste is synthesized by, for example, the solid-phase method.

Subsequently, multilayer chip 10 on which the ceramic paste is applied is sintered to form element body portion 110.

Figure 22:
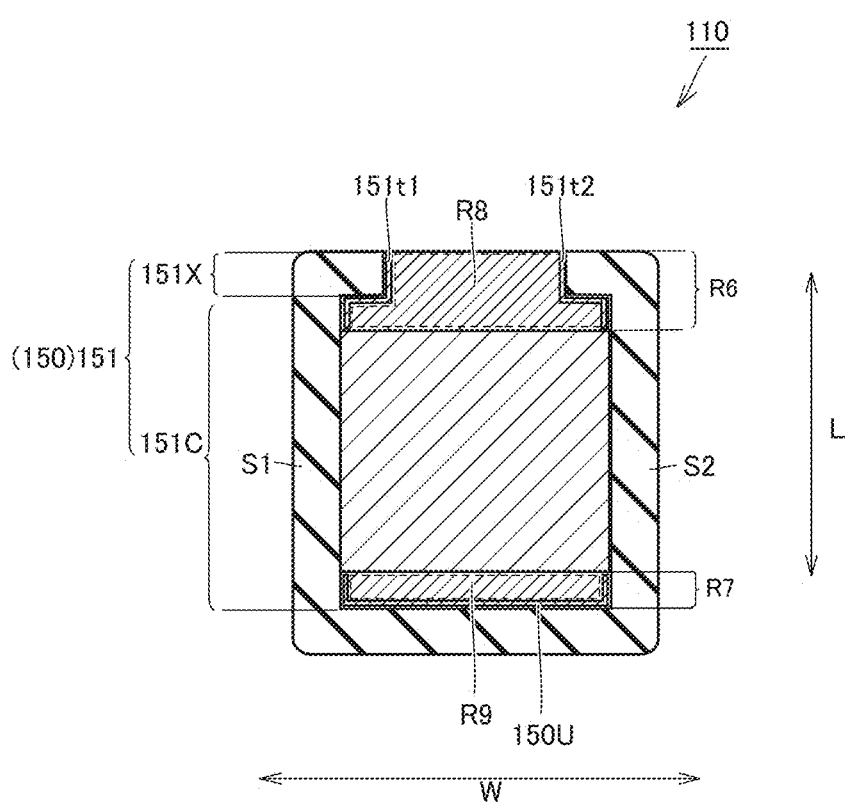
FIG. 22 is a diagram showing a region where a predetermined component is segregated in a portion of an internal electrode layer in an element body portion formed by sintering a multilayer chip applied with a ceramic paste.

FIG. 22 is a diagram showing a region where a predetermined component is segregated in a portion of the internal electrode layer in the element body portion formed by sintering the multilayer chip applied with the ceramic paste of the predetermined component in the element body portion according to the example embodiment.

As shown in FIG. 22, in internal electrode layer 150 (more specifically, first internal electrode layer 151) of element body portion 110, Si and/or Mg contained in ceramic paste 25 overlapping conductive pattern 24 is segregated in region R6 and region R7.

In region R6, Si and/or Mg is segregated on the principal surface on one side of first lead-out portion 151X in the thickness direction and on the principal surface on one side of first opposing portion 151C of a portion located on first lead-out portion 151X side. In particular, the segregation amount of Si or Mg in the regions on both end sides in width direction W of the outer periphery of region R6 is larger than that in an inner region R8 of region R6.

In region R7, Si and/or Mg is segregated on the principal surface on one side of first opposing portion 151C on the end portion side located on the side opposite to the side located on first lead-out portion 151X side in length direction L. In particular, in a portion of the outer periphery of region R7 along first side margin portion S1, second side margin portion S2, and dielectric layer 140, the segregation amount of Si or Mg is larger than that in an inner region R9 of region R7. That is, in the internal electrode layer, the segregation amount of Si or Mg is increased in non-connection end portion 150U which is located on the side opposite to the side where the lead-out portion is located in length direction L and is not connected to the external electrodes.

On second internal electrode layer 152 side, Si and/or Mg is segregated as in first internal electrode layer 151.

Subsequently, first external electrode 120 and second external electrode 130 are formed on both end surfaces (first end surface 115 and second end surface 116) of element body portion 110, respectively. Specifically, a Cu paste including micronized Cu particles is applied to both end surfaces of element body portion 110. As the application method, for example, a method of forming a paste layer serving as the first layer portion on a plate and immersing the end surfaces in the paste layer can be employed. The applied paste layer is baked, and plating is performed in the order of Cu plating, Ni plating, and Sn plating.

Through the above steps, multilayer ceramic capacitor 100 according to the present example embodiment can be manufactured.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

an element body portion including a first principal surface and a second principal surface opposite to each other in a thickness direction, a first side surface and a second side surface opposite to each other in a width direction, and a first end surface and a second end surface opposite to each other in a length direction, and a plurality of dielectric layers and a plurality of internal electrode layers laminated in the thickness direction; and a pair of external electrodes respectively on the first end surface and the second end surface, and electrically connected to the plurality of internal electrode layers; wherein in a cross section of the element body portion extending through a central portion in the length direction and parallel or substantially parallel to the thickness direction and the width direction, a deviation amount in the width direction between internal electrode layers adjacent to each other in the thickness direction is smaller than about 3 µm;

each of the plurality of internal electrode layers includes an opposing portion opposed to the internal electrode layer which is adjacent in the thickness direction, and a lead-out portion connected to the opposing portion and extending to the first end surface or the second end surface;

a width of the opposing portion is greater than a width of the lead-out portion in the width direction;

a region of the element body portion at which the lead-out portions overlap in the thickness direction includes a thick portion which is thicker than the central portion of the element body portion in the length direction; and end portions in the width direction of the lead-out portions which are adjacent to each other in the thickness direction are deviated by about 3 µm or more in the width direction.

2. The multilayer ceramic capacitor according to claim 1, wherein Si or Mg is segregated in both end portions of the lead-out portion in the width direction.

3. The multilayer ceramic capacitor according to claim 1, wherein Si is segregated on a principal surface of the lead-out portion on one side in the thickness direction.

4. The multilayer ceramic capacitor according to claim 1, wherein Mg is segregated on a principal surface of the lead-out portion on one side in the thickness direction.

5. The multilayer ceramic capacitor according to claim 1, wherein each of the plurality of internal electrode layers includes a non-connection end portion not connected to the external electrodes on a side opposite to a side on which the lead-out portion is located in the length direction; and Si is segregated in the non-connection end portion.

6. The multilayer ceramic capacitor according to claim 1, wherein each of the plurality of internal electrode layers includes a non-connection end portion not connected to the external electrodes on a side opposite to a side on which the lead-out portion is located in the length direction; and Mg is segregated in the non-connection end portion.

7. The multilayer ceramic capacitor according to claim 1, wherein the pair of external electrodes respectively cover an entirety or substantially an entirety of the first and second end surfaces.

8. The multilayer ceramic capacitor according to claim 1, wherein each of the pair of external electrodes extends onto portions of the first and second principal surface and the first and second side surfaces.

9. The multilayer ceramic capacitor according to claim 1, wherein each of the plurality of dielectric layers includes a perovskite compound including Ba and Ti as a primary component.

10. The multilayer ceramic capacitor according to claim 1, wherein each of the plurality of dielectric layers includes Si, Mg, Mn, V, Cr, or rare earth element as an additive.

11. The multilayer ceramic capacitor according to claim 1, wherein each of the plurality of internal electrode layers includes Ni.

12. The multilayer ceramic capacitor according to claim 1, wherein each of the plurality of internal electrode layers includes Sn at an interface with respective ones of the plurality of dielectric layers.

13. The multilayer ceramic capacitor according to claim 1, wherein the multilayer ceramic capacitor has a dimension in the length direction of greater than or equal to about 0.2 mm and less than or equal to about 4.5 mm, a dimension in the width direction of greater than or equal to about 0.125 mm and less than or equal to about 3.2 mm, and a dimension in the thickness direction of greater than or equal to about 0.125 mm and less than or equal to about 2.5 mm in thickness direction.

14. The multilayer ceramic capacitor according to claim 1, wherein the lead-out portion of an internal electrode layer of the plurality of internal electrode layers closest to the first principal bulges towards the first principal surface; and the lead-out portion of an internal electrode layer of the plurality of internal electrode layers closest to the second principal bulges towards the second principal surface.

15. The multilayer ceramic capacitor according to claim 1, wherein each of the first end surface and the second end surface is recessed inward in the length direction toward a central portion in the thickness direction.

16. The multilayer ceramic capacitor according to claim 1, wherein a shortest distance from end portions of the lead-out portions to the first and second end surfaces is greater than or equal to about 90 μm and less than or equal to about 110 μm.

17. The multilayer ceramic capacitor according to claim 1, wherein each of the first and second principal surfaces bulge outward in the thickness direction at both end portion sides in the length direction.

* * * * *